United States Patent [19]
Rosen

[11] 3,984,922
[45] Oct. 12, 1976

[54] ROTORS

[76] Inventor: Leo Rosen, Apt. C, Heritage Apartments, River Road, Essex, Conn. 06426

[22] Filed: Oct. 10, 1944

[21] Appl. No.: 558,066

[52] U.S. Cl. .................................................. 35/4
[51] Int. Cl.² .......................................... G09C 5/00
[58] Field of Search ...................................... 35/4

[56] References Cited
UNITED STATES PATENTS

| | | | |
|---|---|---|---|
| 1,210,656 | 1/1917 | Kintner | 35/4 X |
| 1,683,072 | 9/1928 | Hebern | 35/4 |
| 2,006,436 | 7/1935 | Bowers | 339/18 |
| 2,111,118 | 1/1938 | Lake | 339/42 |
| 2,407,695 | 9/1946 | Washcoe | 35/4 X |
| 2,529,487 | 11/1950 | Cooley | 35/4 |

FOREIGN PATENTS OR APPLICATIONS

| | | | |
|---|---|---|---|
| 554,421 | 7/1932 | Germany | 35/4 |

*Primary Examiner*—Malcolm F. Hubler
*Attorney, Agent, or Firm*—John R. Utermohle

EXEMPLARY CLAIM

1. A cryptographic rotor including a first disc having an annular array of input contacts on one face thereof, a second disc having an annular array of output contacts on one face thereof, a plurality of wires connecting the input contacts to the output contacts in pairs, and means for supporting said two discs for rotative movement relative to each other.

2 Claims, 4 Drawing Figures

LEO ROSEN
INVENTOR
William D Hall
ATTORNEY

ROTORS

This invention is in the cryptographic art and particularly is an improvement on commutating devices commonly used in electrical cryptographic apparatus.

One object of the present invention is to provide a cryptographic rotor with readily variable connections between the contacts thereof.

Another object is to provide readily variable paths through cryptographic rotors.

Other objects will be apparent from a reading of the following specification and claims.

Figure 1:
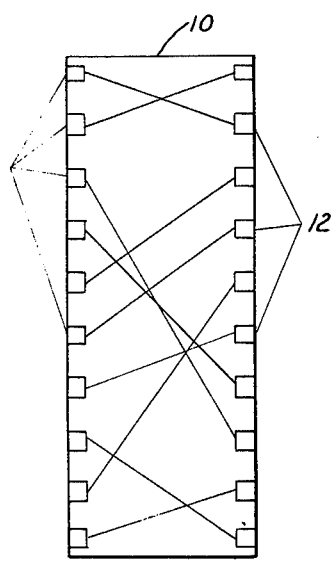
FIG. 1 illustrates in diagram a cryptographic rotor of standard construction.

Referring to the drawings, and particularly to FIG. 1, the conventional cryptographic rotor, which is substantially like that shown in U.S. Pat. No. 1,683,072, to Hebern, may be seen to comprise a body member 10, of Bakelite or some similar insulating material, a plurality of input contacts 11, and a similar plurality of output contacts 12. The input contacts are randomly connected to the output contacts so that an electrical signal introduced at a given input contact will not normally be carried to the corresponding output contact, but, instead, to an output contact displaced one or more positions from the input contact.

A rotor of the type described normally has fixed internal wiring, or wiring that can be changed only through considerable labor. Connections commonly are soldered.

Figure 2:
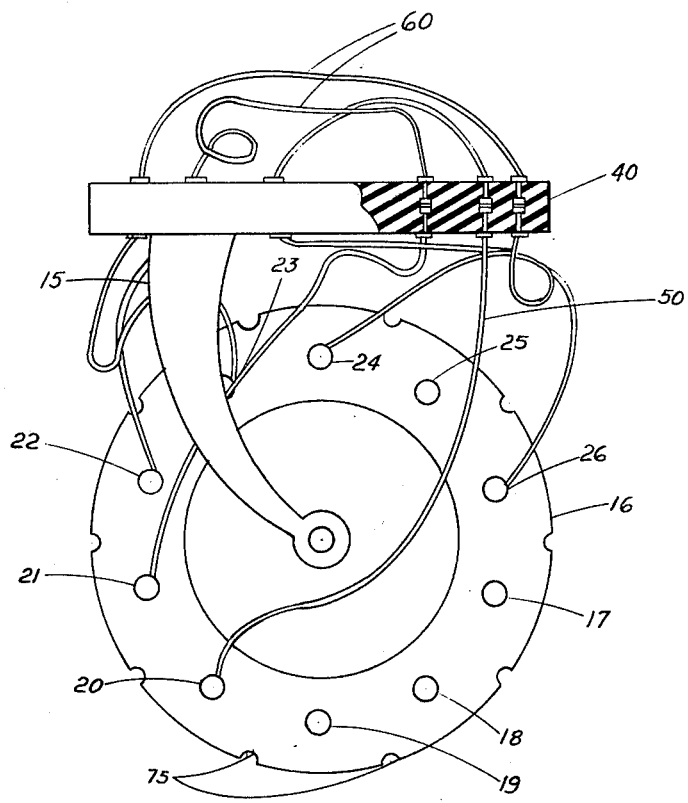
FIG. 2 is a view of the device of this invention, partly in section, and with one rotor element removed.

With reference now to FIG. 2, the present invention may be seen to include a central member 15. Associated with central member 15, for limited rotation relative thereto, is a rotor element 16 including a rotor proper and a series of contacts 17 to 26, inclusive. Similarly mounted on the opposite side of central member 15 is another rotor element 30 (see FIG. 3) substantially like the element just described, and comprising a Bakelite element 35 and ten contacts. Only six of these last mentioned contacts, 36–41, and six contacts (19 through 24) of member 16, appear in FIG. 3.

Attached to the upper portion of member 15 is a plugboard comprising a member 40 of insulating material and a number of sockets, as 41, adapted to receive cooperating plugs in both top and bottom.

Figure 3:
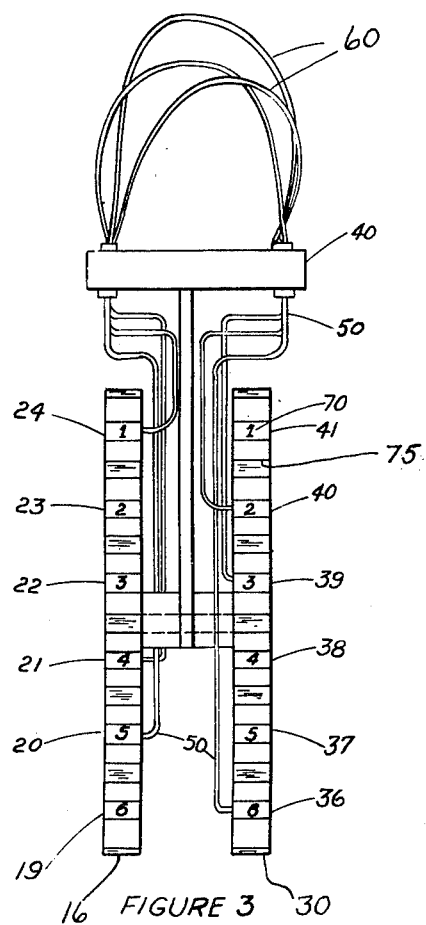
FIG. 3 is a somewhat diagrammatic edge view of the structure of this invention.
Figure 4:
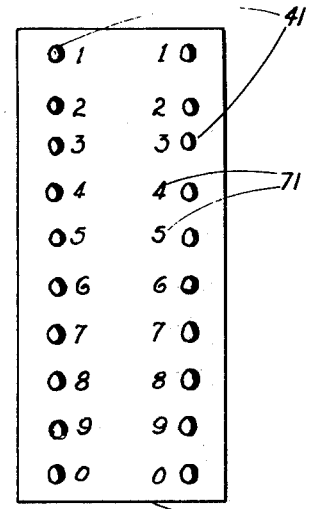
FIG. 4 is a top view of the plugboard utilized in the invention.

Whereas, in the standard rotor, illustrated in FIG. 1, the input and the output contacts are connected directly, it will be seen in FIGS. 2 and 3, that, according to this invention, connecting wires, as 50, are each secured at one end to a different one of the several contacts of rotor elements 16 and 30, and provided at their other ends with plugs, as 42, adapted for insertion into the plugboard 40. Normally, of course, every one of the contacts will have secured to it a connecting wire 50. Only a few of the wires, however, are shown in the drawings.

It will, thus, be understood that the rotor of the present invention is not adapted to turn freely as a unit through a full 360° circle; the effects of such rotation, however, can be obtained as a result of the fact that each of the rotor elements 16 and 30 is movable a limited angular distance (fixed by the lengths of the wires 50) and that the two said elements move relative not only to support 15 but also to each other.

Jumper cords, as 60, are provided, and these also are fitted with plugs, as 62, for insertion in the top of the plugboard 40.

Each of the input contacts has associated with it a numerical character or other indicating device, as 70. For convenience, the sockets on the plugboard are arranged in two groups, each relating to one of the rotor elements 16 and 30, and these sockets likewise bear indicating devices, as the numerals 71.

The operation of the device should be apparent and will only be briefly described. Assuming that each contact has wire soldered or otherwise attached to it in the interior of the rotor, and that each wire is provided with a plug, and is long enough to permit rotation of the rotor elements proper, the plugs are inserted from below in plugboard 40 in any desired order. For the purposes of explanation, it can be assumed that "0" wire of rotor element 16 is plugged into the "0" socket of plugboard 40, on the left side thereof, "1" wire into socket "1", etc. The contact wires for rotor element 30 are similarly inserted in the right side of the plugboard. The jumper cords are then used to connect the input contacts to the output contacts through the plugboard in any desired order.

One set of contacts, for instance, 17 through 26 will normally serve as inputs to the rotor, and the other set will serve as outputs.

As will be seen, the electrical paths through the rotor, in other words, the connections between input and output contacts, can readily be changed merely be changing the jumper cords. The paths can also be changed, of course, by altering connections between contacts and plugboard. Still further alterations can be made in the circuits through the rotor, when the device is used with one or more other rotors, by stepping one or both of the elements 16 and 30 in either direction. Notches 75 are utilized for manual or mechanical stepping.

The above description is in specific terms and it should be understood that the invention is not limited to the exact structure shown and described. Rather, for the true scope of the invention reference should be had to the appended claims.

I claim:

1. A cryptographic rotor including a first disc having an annular array of input contacts on one face thereof, a second disc having an annular array of output contacts on one face thereof, a plurality of wires connecting the input contacts to the output contacts in pairs, and means for supporting said two discs for rotative movement relative to each other.

2. A cryptographic rotor including a first disc having an annular array of input contacts thereon, a second disc hving an annular array of output contacts thereon, and a support including means for mounting said discs thereon for rotative movement relative to each other and to said support, a plurality of wires connecting the said input contacts to the output contacts in pairs, and plugboard means for variably making the connections.

* * * * *